J. H. HAND.
CHANGE SPEED GEARING.
APPLICATION FILED AUG. 13, 1914.

1,177,619.

Patented Apr. 4, 1916.
4 SHEETS—SHEET 3.

WITNESSES
Robert N. van Dusen
Virginia C. Spratt.

INVENTOR
Jesse H. Hand
BY
Ralzemond A. Parker.
ATTORNEY

THE COLUMBIA PLANOGRAPH CO., WASHINGTON, D. C.

J. H. HAND.
CHANGE SPEED GEARING.
APPLICATION FILED AUG. 13, 1914.

1,177,619.

Patented Apr. 4, 1916.
4 SHEETS—SHEET 4.

WITNESSES
Robert N. Van Bokkelen
Virginia C. Spratt.

INVENTOR
Jesse H. Hand
BY
Ralzemond A. Parker
ATTORNEY

UNITED STATES PATENT OFFICE.

JESSE H. HAND, OF ANN ARBOR, MICHIGAN.

CHANGE-SPEED GEARING.

1,177,619.  Specification of Letters Patent.  Patented Apr. 4, 1916.

Application filed August 13, 1914. Serial No. 856,558.

*To all whom it may concern:*

Be it known that I, JESSE H. HAND, a citizen of the United States, residing at Ann Arbor, county of Washtenaw, State of Michigan, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

Figure 1:
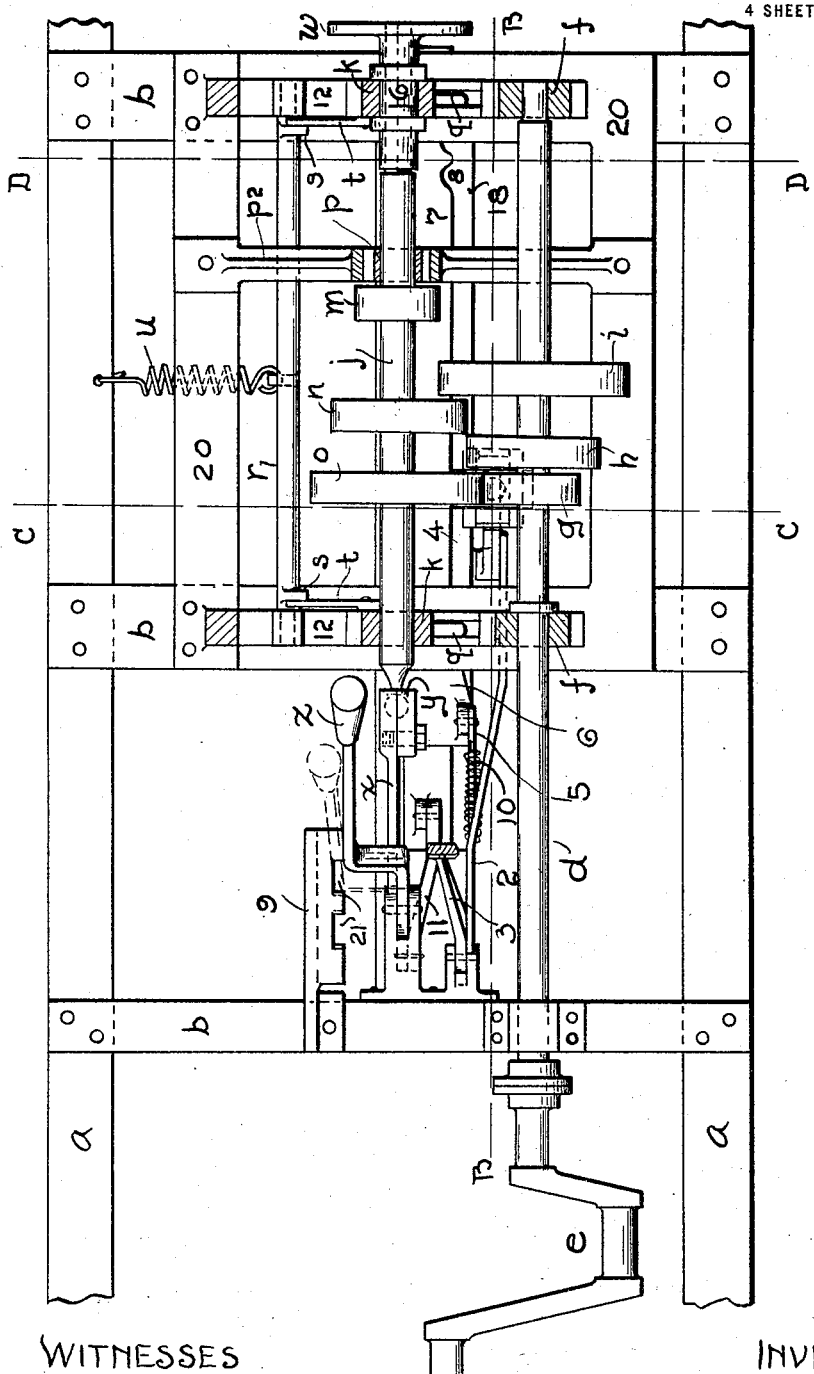
Figure 2:
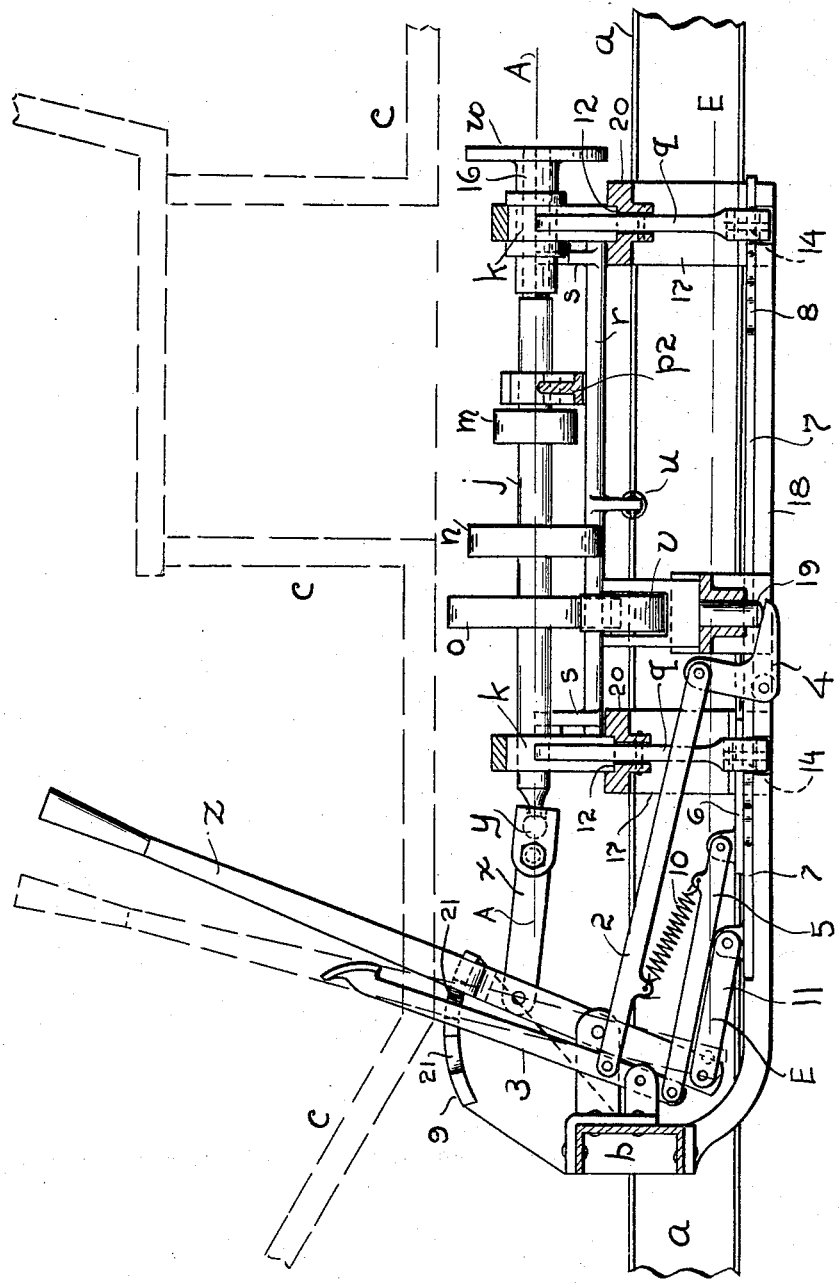
Figure 3:
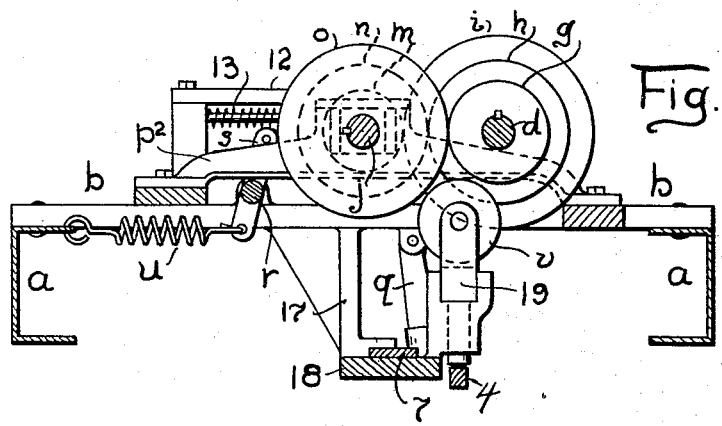
Figure 4:
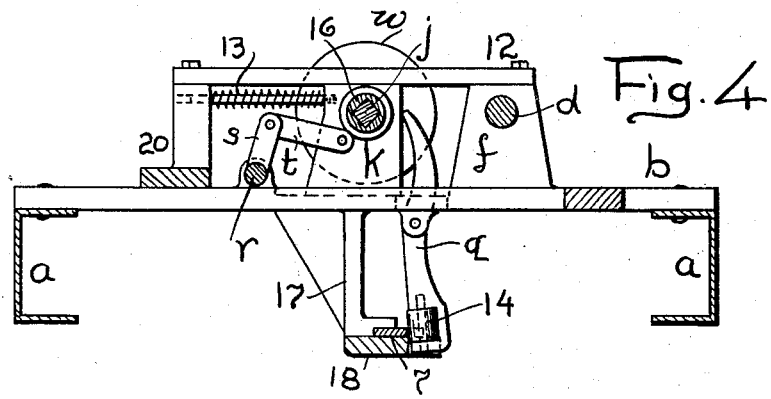
Figure 5:
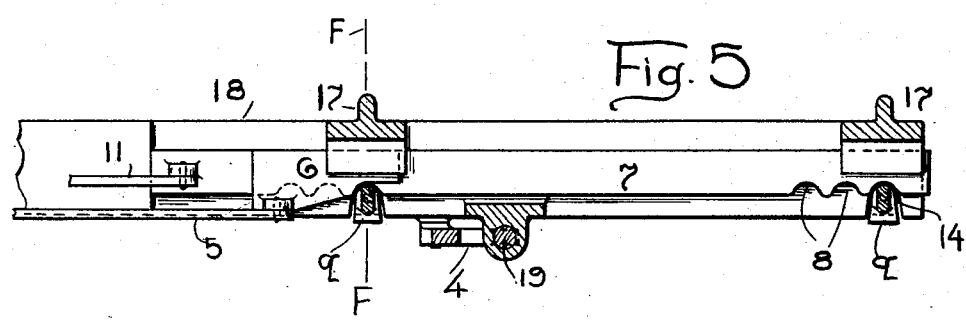
Figure 6:
Figure 7:
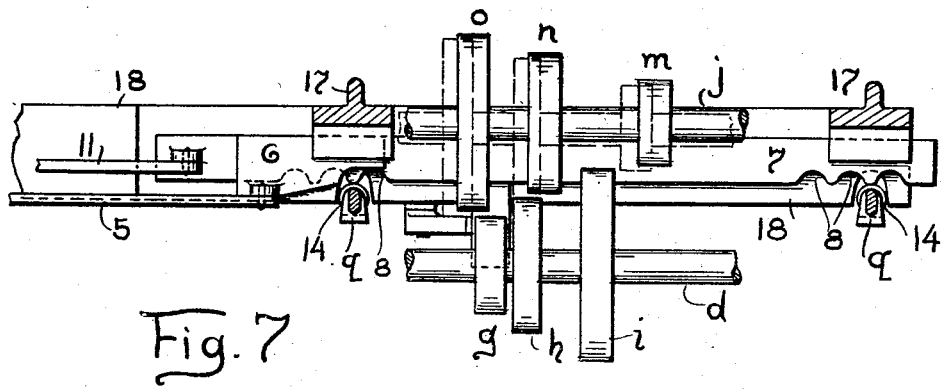
Figure 8:
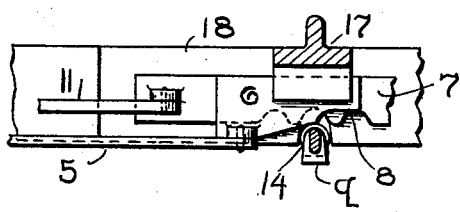
Figure 9:
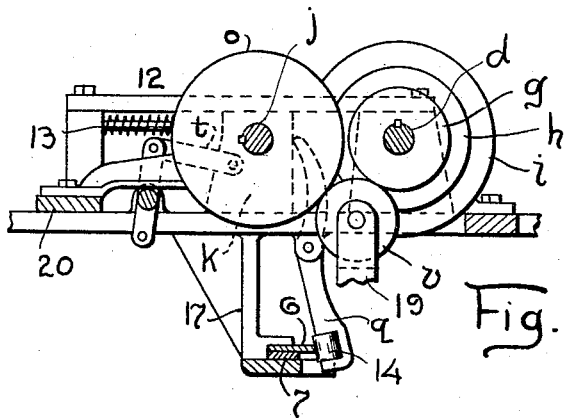

My invention relates to change speed gears and an object of my improvements is to provide an improved friction gearing for adjusting the relative angular speeds of the driving and driven shafts on an automobile. I secure this object in the apparatus illustrated in the accompanying drawings, in which, Figure 1, is a plan view of a portion of the chassis of an automobile with an apparatus embodying my invention secured thereon. Fig. 2, is a sectional elevation on the line B—B Fig. 1 looking from the side of said figure which is toward the lower border of the sheet. Fig. 3, is a sectional elevation on the line C—C Fig. 1 looking from the left of said line. Fig. 4, is a sectional elevation on the line D—D Fig. 1 looking from the left of said line. Fig. 5, is a detail plan view showing the cam slides and adjacent parts of the section D taken on the line E—E Fig. 2. Fig. 6, is a detail elevation partly in section, the section being taken on the line F—F Fig. 5. Fig. 7, is a detail plan view, some of the parts being removed in order to more clearly illustrate the mode of action of the device. Fig. 8, is a detail plan view illustrating the way in which the driving gears are thrown out of engagement when the reverse gear is thrown into engagement. Fig. 9, is a detail elevation illustrating the adjustment of the reverse gear.

*a a* are side pieces of the chassis of an automobile and *b b* are cross pieces.

20, 20 indicates a frame which may be secured upon the cross pieces *b b*, as shown in Fig. 1.

*c* (Fig. 2) indicates by dotted lines the position of the body of the automobile.

*d* is the driving shaft and *e* is the crank by which the driving shaft *d* is turned as by any suitable motor.

*g, h, i,* are friction wheels of varying diameters and properly spaced and rigidly secured upon the shaft *d*, said shaft is secured and adapted to rotate in bearings *f f* on the frame 20.

12, 12 are horizontal ways extending transversely of the frame 20 and supported by said frame.

*k k* are sliding blocks adapted to reciprocate in the ways 12, 12.

$p^2$ is a cross bar arched upward and secured at its ends to the side pieces of the frame 20. The cross piece $p^2$ is provided with a sliding way at its center in which is the sliding block *p*.

*j, j,* is a counter shaft adapted to rotate in bearings in one of the sliding blocks *k* and in the sliding block *p*. 16, is a short shaft in line with the shaft *j* and adapted to rotate in a bearing in the other of the sliding blocks *k'*. The shafts *j* and 16 are united at their adjacent ends preferably by a socket and a squared portion extending therein to form a sliding joint which shall cause said shafts to rotate together.

*w* is a face plate affording facility for attachment of the transmission shaft of an automobile.

*m, n, o* are friction wheels rigidly secured upon the shaft *j* and properly spaced thereon. The friction wheel *o* is adapted to engage the friction wheel *g* to secure the low speed ahead and the friction wheel *n* to engage the friction wheel *h* to secure the second forward speed and the friction wheel *m* to engage the friction wheel *i* to secure the third speed power. The relative diameters of the wheels *m n o* are in the inverse ratio of the friction wheels *g, h, i* so that when the wheels engage in the various pairs, as above described, the centers of the shafts *d* and *j* shall be substantially the same distance apart.

13—13 indicate springs acting to press the sliding blocks *k k* laterally so as to press the pairs of friction wheels together.

*r* is a rocker shaft having the upwardly extending arms *s s* connected at their upper ends by connecting rods *t t* with the sliding blocks *k k*.

*u* is a tension spring tending to rock the shaft *r* so as to press the sliding blocks *k k* laterally to carry the shaft *j* and the friction wheels *m n o* toward the shaft *d* and the friction wheels *i h g*.

*q, q,* are rocker arms, the upper ends of which bear against the sliding blocks $k$ $k$ and act to press said blocks against the action of the springs 13—13 so as to force the shaft $j$ away from the shaft $d$. The rocker arms $q$, $q$ are provided with rollers 14 at their lower ends.

17, 17 are hangers extending downward from the frame 20 and united at their lower ends by a horizontal plate or bar 18.

7, is a cam bar adapted to slide in ways on the plate 18 and provided toward its ends with a series of cams 8, 8 adapted to act upon the lower ends of the rocker arms $q$, $q$ through the friction rollers 14 to rock said arms and press back the sliding blocks $k$ $k$.

$z$ is a hand lever pivoted so as to traverse a rack 9 and adapted to engage in notches 21 on said rack.

$x$ is a connecting rod pivoted to the lever $z$ above its pivot and connected to the adjacent end of the shaft $j$ by a universal joint $y$. 11, is a connecting rod pivoted to the lever $z$ below its pivot and to the cam bar 7 (Fig. 2.)

By manipulating the lever $z$ the shaft $j$ is moved longitudinally to bring the wheel $o$ into position to engage the wheel $g$ or the wheel $n$ into position to engage the wheel $h$ or the wheel $m$ into position to engage the wheel $i$. When the shaft $j$ is being drawn to these various positions the rocking of the lever $z$ moves the cam bar 7 which acts through the cams 8—8 and by them through the rocker arms $q$, $q$ to press back the sliding blocks $k$ $k$ and carry the shaft $j$ away from the shaft $d$ so that none of the friction wheels shall be in engaging position to obstruct the movement or shifting of the parts. The spaces between the cam 8 serve to mark the different speed positions of the wheels.

The position of the wheels during the shifting motion is indicated by full lines in Fig. 7 and by dotted lines in the second forward speed condition with the wheels $h$ and $n$ in engagement.

$v$ (Figs. 2, 3 and 9) indicates a reverse gear wheel located below and in the plane of the wheel $g$ and in such a position that if it is pressed upward it will engage the wheel $g$ and any wheel on the shaft $j$ that will be in the same plane as the wheels $q$ or $v$. The wheel $v$ is adapted to travel vertically by being mounted in a fork having a downwardly extended sliding portion 19 which is adapted to reciprocate in bearings but permit a limited lateral motion of the wheel $v$ relative to the frame 20 and the chassis of the automobile. 4, is a bell crank lever pivoted so that one of its arms shall extend under the portion 19. 6, is a cam plate adapted to act upon the roller 14 at the lower end of one of the roller arms $q$ to rock said arms and separate the friction wheels on the shafts $d$ and $j$. 3, is a foot lever. 2, is a connecting rod pivoted to the lever 3 above its pivot and to one arm of the bell crank lever 4. 5, is a connecting rod pivoted to the lever 3 below its pivot and to the sliding cam plate 6. 10, is a spring tending to restore the lever 3 to its inactive position as shown in Fig. 2.

The wheel $n$ or the wheel $o$ may be moved into the plane of the wheels $j$ and $g$ by moving the shaft $j$ longitudinally, as above described. When one of said wheels is adjusted into said plane, the lever 3 may be rocked which will act through the connecting rod 5 to move the cam plate 6 and press the shaft $j$ to its disengaged position. This same movement of the lever 3 acts through the rock shaft 4 to press the wheel $v$ into engagement with the wheel $g$ and the wheel in the same plane on the shaft $j$ so as to secure a reverse motion of the shaft $j$. The angular motion of the shaft $j$ is communicated to the shaft 16 and then to the transmission shaft of an automobile.

In the use of my improved device I may dispense with the clutch inasmuch as the friction reverse gear may be used for the same purpose.

What I claim is:

1. In a change speed gearing, a shaft, a friction wheel on said shaft, a counter shaft, a plurality of friction wheels on said counter shaft, means for moving said counter shaft longitudinally to bring one or the other of said friction wheels into the plane of the wheel on said shaft, means for directly engaging the wheels in the same plane, and a friction wheel adapted to engage the said friction wheels that have been so brought into the same plane when the last named friction wheels are separated, so as to transmit a reverse motion.

2. In a change speed gearing, a shaft having a friction wheel thereon, a counter shaft having a plurality of friction wheels of different diameters thereon, means for moving said counter shaft longitudinally to bring one or the other of said friction wheels into the same plane as the friction wheel on said shaft, means for engaging the friction wheels in the same plane and means for disengaging said wheels when the counter shaft is moving in the direction of its length.

3. In a change speed gearing, a shaft having a friction wheel thereon, a counter shaft having a plurality of friction wheels of different diameters thereon, means for moving said counter shaft longitudinally to bring one or the other of said friction wheels into the same plane as a friction wheel on said shaft, means for engaging the friction wheels in the same place, a cam adapted to separate said wheels, said cam being actuated by the means for moving said counter shaft longitudinally.

4. In a change speed gearing, a shaft having a friction wheel thereon, a counter shaft having a plurality of friction wheels thereon of different diameters, said counter shaft being movable longitudinally, a lever, a connecting rod joining said counter shaft and said lever, and a cam connected with said lever and adapted to separate said wheels when said lever is oscillated.

5. In a change speed gearing, a shaft having a friction wheel thereon, a counter shaft having a plurality of friction wheels thereon of different diameters, said counter shaft being movable longitudinally, a lever, means for connecting said counter shaft and said lever, and a cam connected with said lever and adapted to separate said wheels when said lever is oscillated, said cam being connected with said lever upon the opposite side of the pivot with reference to said counter shaft connection.

6. In a change speed gearing, a shaft having a friction wheel thereon, a counter shaft having a plurality of friction wheels thereon of different diameters, said counter shaft being movable longitudinally, a lever, means for connecting said counter shaft and said lever, and a cam connected with said lever and adapted to separate said wheels when said lever is oscillated, a friction wheel having its pivot movable in a direction laterally to said shafts in the plane of two engaging friction wheels on said shafts, and a second lever adapted to operate said laterally moving friction wheel.

In testimony whereof, I sign this specification in the presence of two witnesses.

JESSE H. HAND.

Witnesses:
VIRGINIA C. SPRATT,
ROBERT VAN BUSKIRK.

Copies of this patent may be obtained for five cents each, by addressing the "Commissioner of Patents, Washington, D. C."